United States Patent [19]
Kiwiet et al.

[11] Patent Number: 5,854,618
[45] Date of Patent: Dec. 29, 1998

[54] APPARATUS COMPRISING A DISPLAY SCREEN WHICH IS ACTIVE IN THE OPERATING MODE AND IN THE STANDBY MODE

[75] Inventors: Nicoline J. Kiwiet, Yorktown Heights, N.Y.; Robbert G. Van Der Waal, Eindhoven, Netherlands

[73] Assignee: U.S. Philips Corporation, New York, N.Y.

[21] Appl. No.: 962,896

[22] Filed: Nov. 3, 1997

Related U.S. Application Data

[63] Continuation of Ser. No. 559,786, Nov. 15, 1995, abandoned.

[30] Foreign Application Priority Data

Nov. 17, 1994 [EP] European Pat. Off. .............. 94203351

[51] Int. Cl.$^6$ ................................ G09G 5/00; H04N 3/20
[52] U.S. Cl. ......................... 345/115; 345/112; 345/214; 345/418; 348/173
[58] Field of Search ..................................... 345/211, 212, 345/214, 112, 115, 418; 364/413.01; 381/43, 42; 84/477; 359/142; 340/825.06; 395/2.54, 100–200; 348/173

[56] References Cited

U.S. PATENT DOCUMENTS

| | | | |
|---|---|---|---|
| 4,514,729 | 4/1985 | Szarka | 340/825.06 |
| 4,546,690 | 10/1985 | Tanaka et al. | 84/477 R |
| 4,776,016 | 10/1988 | Hansen | 381/42 |
| 4,777,621 | 10/1988 | Miner et al. | 364/900 |
| 5,133,011 | 7/1992 | McKiel, Jr. | 381/43 |
| 5,303,148 | 4/1994 | Mattson et al. | 364/413.01 |
| 5,394,259 | 2/1995 | Takahara | 359/142 |
| 5,412,404 | 5/1995 | Candy | 345/211 |
| 5,448,262 | 9/1995 | Lee et al. | 345/212 |
| 5,498,003 | 3/1996 | Gechter | 273/434 |
| 5,519,809 | 5/1996 | Husseiny et al. | 395/2.84 |

OTHER PUBLICATIONS

Voice Lock 1.05, "Systems Stay Safe and Sound" Stephens, Sara G Windows Magazine, Nov. 1, 94, v5 n11 p. 174.

After Dark 2.0, Waters, Crystal Home Office Computing, Nov. 1, 91, v9 n11 pp. 56–57.

*Primary Examiner*—Jeffery Brier
*Assistant Examiner*—David L. Lewis
*Attorney, Agent, or Firm*—Bernard Franzblau

[57] ABSTRACT

A display apparatus includes the switching unit for switching between an operating mode and a standby mode. The apparatus generates a picture on a display screen in the standby mode. The apparatus includes, for example a microphone for measuring a sound volume in the vicinity of the apparatus. The microphone is coupled to the picture-generating unit in order to change the picture in the standby mode in response to a change of the measured sound volume.

15 Claims, 1 Drawing Sheet

APPARATUS COMPRISING A DISPLAY SCREEN WHICH IS ACTIVE IN THE OPERATING MODE AND IN THE STANDBY MODE

This is a continuation of application Ser. No. 08/559,786, filed Nov. 15, 1995 now abandoned.

This invention relates to an apparatus which includes switching means for switching the apparatus between an operating mode and a standby mode, a display screen, and a picture generating unit for generating a picture on the display screen in the standby mode.

BACKGROUND OF THE INVENTION

When the apparatus is a PC (Personal Computer) operating on the basis of the Microsoft® Windows® program, for example, it is known to switch over from the operating mode to a standby mode if no operations are to be executed via the keyboard for a time interval of predetermined duration. The standby mode is in that case a so-called "screen saving" mode in which the picture is, for example, darkened or changes in the course of time in order to prevent burning in of the display screen.

SUMMARY OF THE INVENTION

It is, inter alia, an object of the invention to provide an apparatus which is more attractive to the consumer in the standby mode and which provides an alternative method of changing the picture.

The apparatus in accordance with the invention includes measuring means for measuring a value of a parameter of an environment of the apparatus, coupled to the picture-generating means, in order to change a picture composition in the standby mode in response to a change of the measured value. The parameter of the environment is preferably chosen so that the user of the apparatus can directly influence this parameter independently of any user operable input devices for the apparatus; (by way of normal physical expressions which are not specifically aimed at control members for the operating mode of the apparatus). This concerns more than changes due exclusively to the elapse of time. Thus, the apparatus is prevented from monotonously displaying the same picture in the standby mode. The user can knowingly or unknowingly induce a change of the composition of the picture while the apparatus remains in the standby mode.

In one embodiment of the apparatus in, the parameter is a sound signal. Notably a sound signal can be simply influenced by the user in a variety of ways, so that a variety of changes of the picture composition are possible in response thereto.

An embodiment of the apparatus in accordance with the invention is characterized in that the measuring means are arranged to measure at least one of the following properties of the sound signal:

a volume a pitch a frequency at which maxima occur in the volume, and that the picture-generating means are arranged to change the picture composition in response to a change of at least one of said properties. Other feasible parameters are for example an ambient temperature, an ambient light intensity, a spectral composition of the ambient light, etc.

An embodiment of the apparatus in accordance with the invention is characterized in that the measuring means are arranged to measure at least two of said properties of the sound signal, and that picture-generating means are arranged to induce a unique, respective change of the picture composition in response to a change of each of the measured properties. By coupling a unique type of response to each type of change, a varied picture change is achieved.

An embodiment of the apparatus in accordance with the invention is characterized in that the picture-generating means are arranged to change at least one of the following picture characteristics in response to the change of the measured value:

a colour contents a size of objects displayed a number of objects displayed.

For example, a change of size can be coupled to a change of sound volume, a change of colour can be coupled to a change of frequency, and another change can be coupled to a change of pitch. Other combinations, however, are also feasible. The user himself may even be allowed to adjust the combinations to be used.

The invention is particularly suitable for use in a television receiver; this receiver will usually be switched between the operating mode and the standby mode by the user. The invention, however, can also be used in other apparatus, not only for screen saving purposes but also for energy saving purposes when a part of the apparatus which is normally supplied with energy in the operating mode is not supplied with energy or with less energy, in the standby mode. Generally speaking, in the standby mode an essential part of the apparatus, for example, the receiving section, is substantially inactive in the function for which it is provided (for example, supplying the display screen with supplied information and/or information explicitly selected by the user).

BRIEF DESCRIPTION OF THE DRAWINGS

These and other aspects of the invention and its advantages will be described in detail hereinafter with reference to the drawing; in which.

DETAILED DESCRIPTION OF THE PREFERRED EMBODIMENTS

Figure 1:
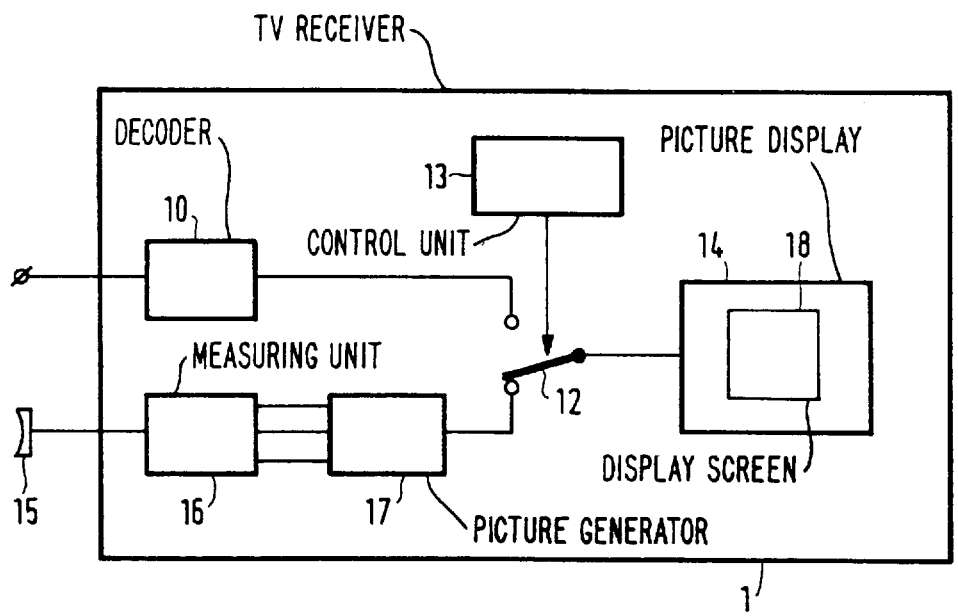
FIG. 1 shows an apparatus in accordance with the invention.

FIG. 1 shows, by way of example, an apparatus 1 in the form of a television receiver. The receiver includes a receiving and decoding section 10 with an input and an output. The receiver 1 also includes a microphone 15 which is coupled to a measuring unit 16 which itself is coupled to picture-generating means 17. The output of the picture-generating means 17 and that of the receiving and decoding section 10 are coupled to a switch 12 which optionally connects one of the two outputs to picture display means 14. The picture display means includes a display screen 18. The switch 12 is controlled by a control unit 13.

During operation, the control unit 13 receives switching commands, for example from a remote control, in response to which the control unit 13 can switch the switch 12 to and fro between a first position, in which the output of the receiving and decoding section 10 is coupled to the picture display means 14, and a second position in which the output of the picture-generating means 17 is coupled to the picture display means 14. The first position corresponds to the operating mode of the apparatus 1 whereas the second position corresponds to the standby mode.

In the operating mode the apparatus acts as a television receiver and the display means 14 display, on the display screen 18, video signals received on the input of the receiving and decoding unit 10 (for example, from an aerial, a cable television connection, or a video recorder, etc.).

In the standby mode the display means 14 display a picture on the display screen 18 which has been generated by the picture-generating means 17. The picture-generating means 17 comprise, for example, a processor (not shown) which executes a graphics program so as to generate the picture. The graphics program provides, for example, a picture which comprises a number of circular discs of different colour, diameter and position.

The microphone 15 picks up sound from the environment of the apparatus 1 and hence forms a signal which is applied to the measuring unit 16. The measuring unit determines a number of properties of this signal, for example the volume (the amplitude of the signal averaged over a predetermined period of, for example 1 second), the pitch (for example, the period duration between successive zero crossings of the signal), and the peak frequency, i.e. the inverse of the distance in time between instants at which maxima occur in the volume as a function of time.

The measured values of these properties are applied to the picture-generating means 17 which generate the picture in dependence on the measured values.

Figure 2:
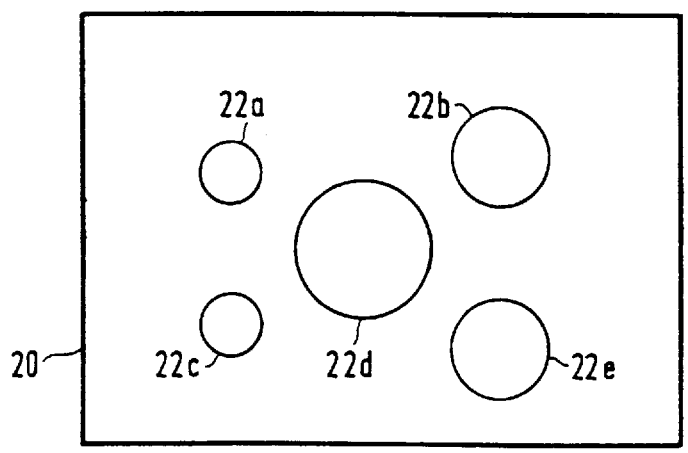
FIG. 2 shows an example of a picture composition.

FIG. 2 shows an example of a composition of a picture 20. For example, each time when a peak occurs in the sound signal, the picture-generating means 17 add to the picture 20 a circular disc 22a–d of a size which is proportional to the sound volume and of a colour of a wavelength which is proportional to the pitch. A circular disc is omitted again some time after having been generated.

It will be evident that this picture 20 is given merely by way of example and that numerous other types of pictures are feasible which can all be made dependent on the measured properties of the sound signal. For example, instead of using graphically generated pictures of circular segments, use can be made of a graphics system which executes graphic commands which result in a generated picture, the graphics commands (for example, outline descriptions as in the language Postscript® by Adobe®, or graphics commands such as are available within Windows® by Microsoft®), being stored in advance in a memory and being supplemented in dependence on the properties of the sound signal (for example with position, colour, rotation or scale commands).

Furthermore, use can be made of a sprite (a bit map of a partial image representing an object) which is stored in a memory, for example a sprite of an animal. For generating the contents of this sprite are then reproduced in the image. Examples of selectable image characteristics are then the choice between different sprites stored in the memory (for example, of different animals), the size of display, colour, speed, direction and path of movements in the image, in dependence on the measured value of the parameter of the environment, for example the sound signal. Use can also be made of pictures of landscapes, as a background, or to introduce changes (seasonal effects, weather conditions, etc.), in dependence on the measured value of the parameter of the environment. Numerous other possibilities also exist.

Preferably, the changes in the composition of the picture concern incremental changes, which means that not each time a new picture is generated whose composition is not related to the previous picture, but that the picture is only partly changed each time.

The pictures and the way in which they depend on the parameters of the environment can also be automatically changed by the apparatus in the course of time (for example, after a period of hours or weeks), or be changed by the user. Thus, the type of sprite or the relationship between the picture characteristics and the properties of the parameter of the environment can be made variable.

Even though the invention is notably suitable for television receivers and monitors for picture reproduction apparatus, and has also been described in this context, it can also be used for other equipment such as personal computers. Instead of the microphone 15 for measuring a sound signal, other types of sensor can be used, for example, sensors for measuring other parameters of the environment, such as temperature, ambient light, motions in the environment etc. Such sensors can also be used in combination or together with a microphone so as to initiate a respective unique change in the picture.

What is claimed is:

1. An apparatus which comprises:
   switching means for switching the apparatus between an operating mode and a standby mode;
   a display screen;
   picture-generating means for generating a picture on the display screen in the standby mode; and
   measuring means for measuring a value of a parameter of an environment of the apparatus, coupled to the picture-generating means, in order to change a composition of the picture on the display screen while in the standby mode in response to a change of the measured value.

2. An apparatus as claimed in claim 1, wherein the parameter is a sound signal.

3. An apparatus as claimed in claim 2, wherein:
   the measuring means are arranged to measure at least one property of the sound signal, the at least one property being one of a volume, a pitch, and a frequency at which maxima occur in the volume; and
   the picture-generating means are arranged to change the picture composition in response to a change of said at least one property.

4. An apparatus as claimed in claim 3, wherein the measuring means are arranged to measure at least two of said properties of the sound signal, and the picture-generating means are arranged to induce a unique, respective change of the picture composition in response to a change of each of the measured properties.

5. The apparatus as claimed in claim 4 wherein the user of the apparatus controls the two said measured properties of the sound signal thereby to control the picture composition in the standby mode.

6. The apparatus as claimed in claim 2 further comprising a microphone coupled to an input of the measuring means and responsive to sound produced in the environment of the apparatus.

7. An apparatus as claimed in claim 1, wherein the picture generating means are arranged to change at least one picture characteristic in response to the change of the measured value, the at least one picture characteristic being one of a color contents, a size of objects displayed and a number of objects displayed.

8. The apparatus as claimed in claim 1 wherein the parameter is a sound signal that is derived from the environment independently of the apparatus.

9. The apparatus as claimed in claim 1 wherein a user of the apparatus can induce a change in the composition of the picture on the display screen while the apparatus remains in the standby mode by causing a change in said parameter and independently of any user operable input devices for the apparatus.

10. The apparatus as claimed in claim 1 wherein the parameter is a sound signal controlled by a user of the apparatus.

11. The apparatus as claimed in claim 1 wherein the parameter is chosen from ambient sound, ambient temperature, ambient light intensity, and spectral composition of ambient light.

12. The apparatus as claimed in claim 1 wherein the picture generating means generates signals in the standby mode for control of the picture composition on the display screen and dependent on the measured values of the parameter supplied to it by the measuring means.

13. The apparatus as claimed in claim 1 wherein the picture generating means generates signals in the standby mode, in response to the measured parameter values, that automatically change the picture composition on the display screen.

14. A television receiver having an operating mode and a standby mode, comprising:

- a receiver for receiving and processing video signals received by the television receiver in the operating mode,
- a display device for the display of video information,
- picture generating means for generating a picture on the display device in the standby mode,
- measuring means for measuring a value of a parameter of an environment of the television receiver and coupled to the picture generating means in order to change a composition of the picture on the display device while in the standby mode and in response to a change of the measured value, and
- switching means coupled between the receiver and the display device and between the picture generating means and the display device for switching the television receiver between the operating mode and the standby mode.

15. The television receiver as claimed in claim 14 further comprising control means for controlling said switching means from the operating mode to the standby mode, wherein time is not the environmental parameter measured by the measuring means.

\* \* \* \* \*